May 24, 1960
J. A. REINA
2,937,878
DETACHABLE WHEEL EMBRACING RUNNERS FOR
CONVERTING A WAGON INTO A SLED
Filed July 15, 1958
3 Sheets-Sheet 1
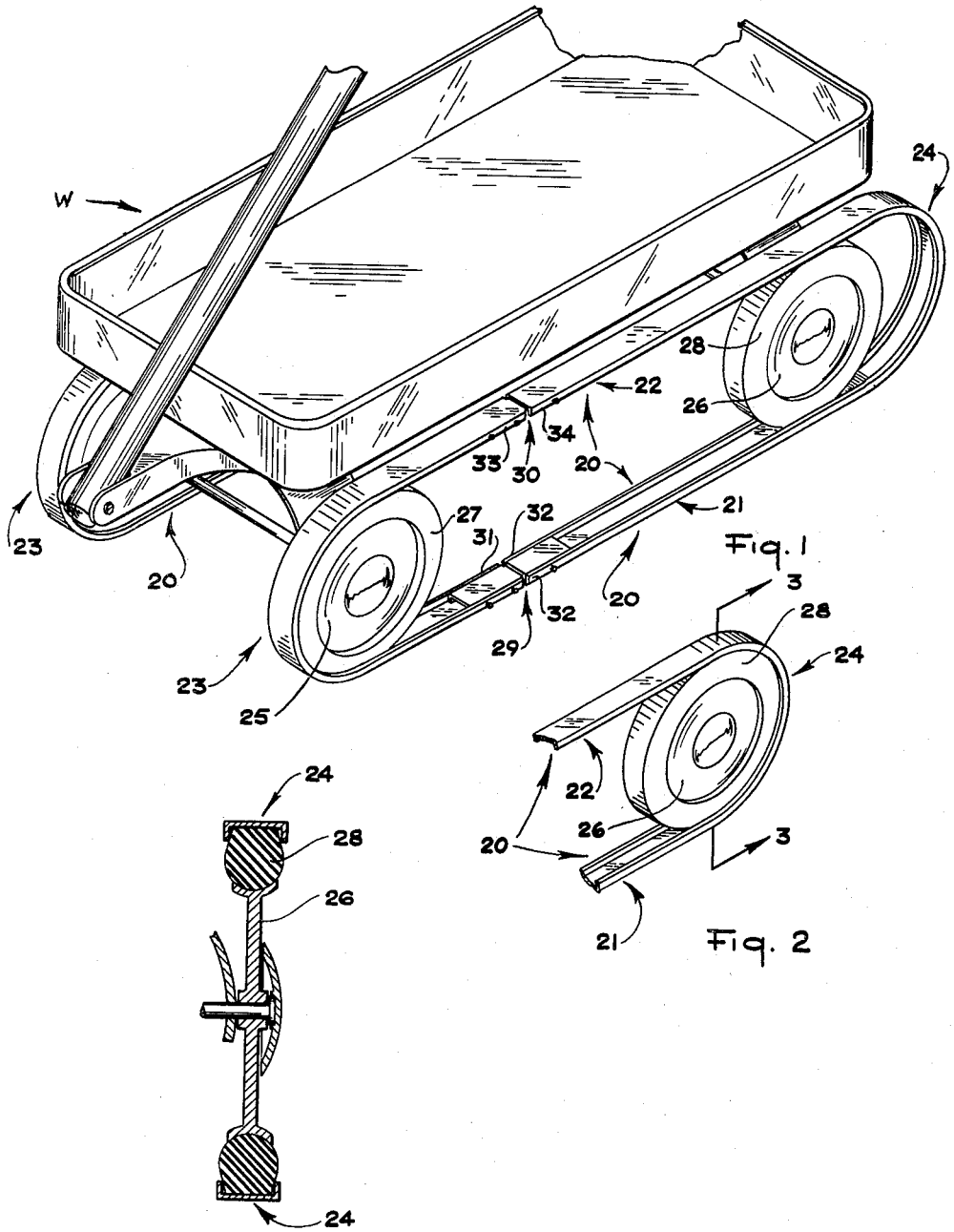
INVENTOR.
JOSEPH A. REINA

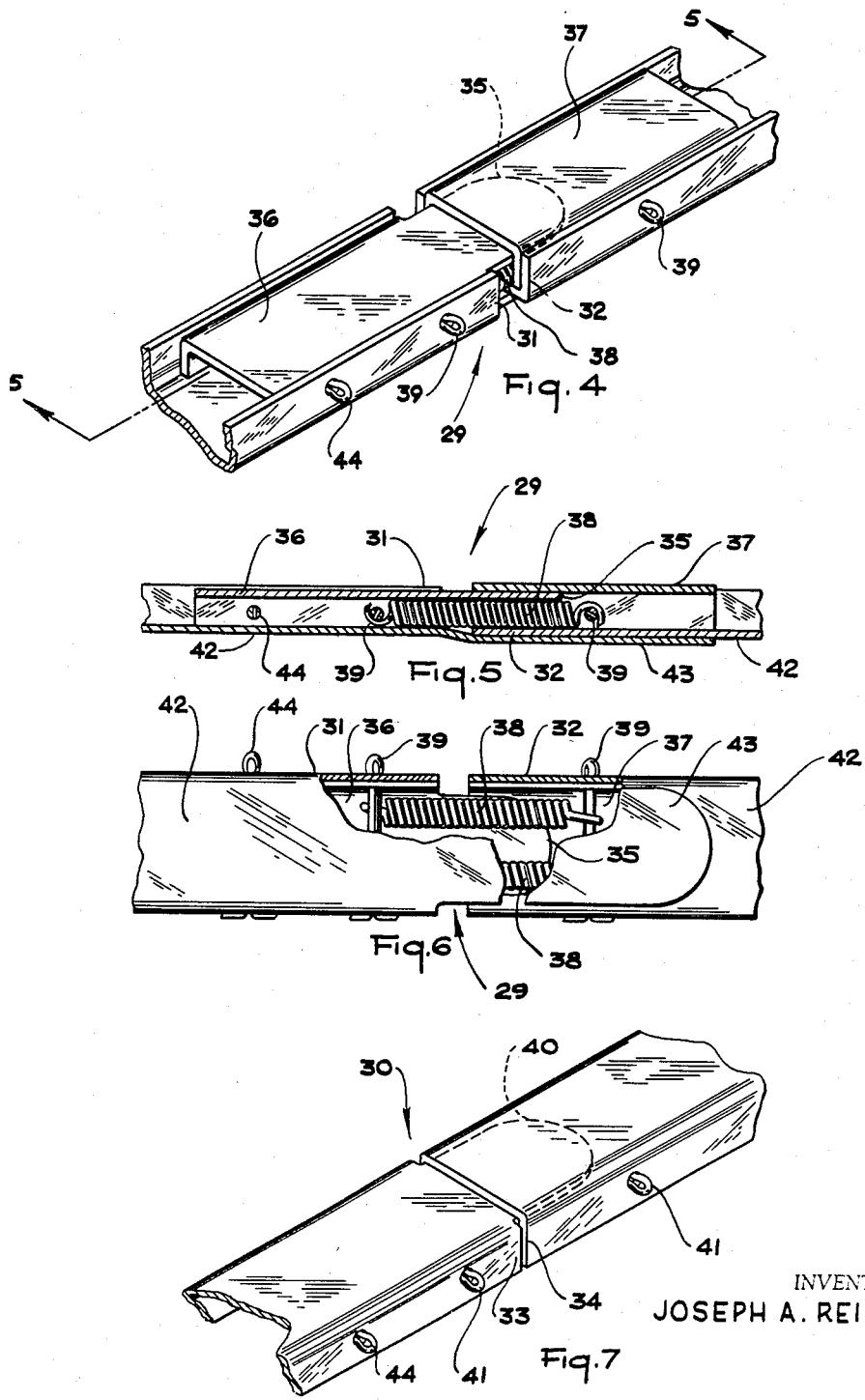

May 24, 1960
J. A. REINA
2,937,878
DETACHABLE WHEEL EMBRACING RUNNERS FOR
CONVERTING A WAGON INTO A SLED
Filed July 15, 1958
3 Sheets-Sheet 3
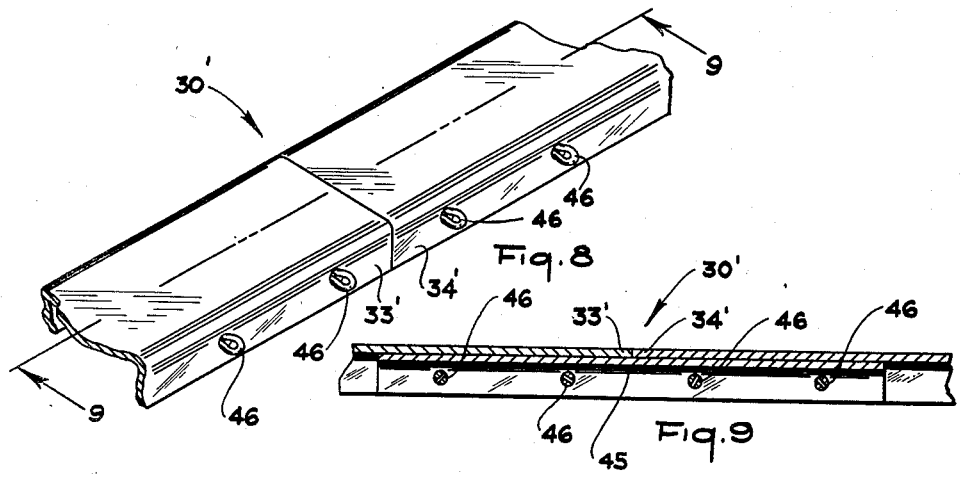
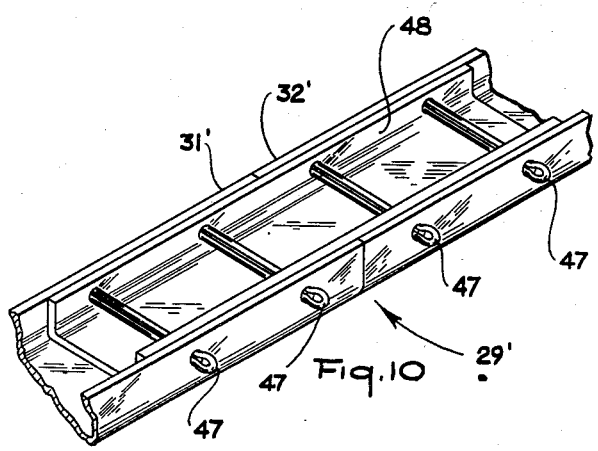
INVENTOR.
JOSEPH A. REINA

United States Patent Office 2,937,878
Patented May 24, 1960

2,937,878

DETACHABLE WHEEL EMBRACING RUNNERS FOR CONVERTING A WAGON INTO A SLED

Joseph A. Reina, 1130 Campagnoli Ave., Copiague, N.Y.

Filed July 15, 1958, Ser. No. 748,715

2 Claims. (Cl. 280—13)

Generally speaking, the present invention relates to the wagon and sled arts and, more particularly, pertains to sled runner apparatus adapted to be removably mounted on the wheels of a wagon to controllably convert the wagon into a sled, and also relates to the combination of a wagon with such sled runner apparatus, thus providing a wagon-sled apparatus convertible from a sled to a wagon and vice versa, and having all of the advantages of a wagon when desired and all of the advantages of a sled when desired, without requiring that the user possess both a wagon and a sled.

With the above points in mind, it is an object of the present invention to provide sled runner apparatus adapted to be removably mounted on the wheels of a wagon to controllably convert the wagon into a sled.

It is a further object of the present invention to provide sled runner apparatus of the type set forth in the preceding object, which includes a left sled runner and a right sled runner, with each sled runner including a longitudinal bottom portion provided with a front end and a rear end, a vertically spaced longitudinal top portion provided with a front end and a rear end, a forwardly convexly curved front portion interconnecting the front ends of said bottom and top portions, and a rearwardly convexly curved rear portion interconnecting the rear ends of said bottom and top portions.

It is a further object of the present invention to provide sled runner apparatus of the character set forth in the preceding object, wherein said curved front and rear portions of each sled runner are of substantially U-shaped concavely inwardly directed cross-sectional configuration of a size and shape adapted to receive therein corresponding circumferential portions of corresponding front and rear wheels of a wagon whereby to effectively immobilize the wagon wheels and isolate them from an underlying supporting surface such as snow, ice, or the like when the wagon sled apparatus is to be used as a sled.

It is a further object of the present invention to provide sled runner apparatus of the character set forth in the preceding object, wherein each sled runner is provided with junction means effectively interconnected between the front curved portion of said sled runner and the front ends of the top and bottom portions thereof, or interconnected elsewhere in each sled runner.

It is a further object of the present invention to provide improved sled runner apparatus of the character set forth in the preceding object, wherein the junction means comprises hinge means providing for transverse pivotal movement of the curved front portion with respect to the front ends of the longitudinal top and bottom portions to allow turning movement of a wagon front wheel adapted to be received within said front curved portion of said sled runner. This is true for each of the two front wagon wheels.

It is a further object of the present invention to provide sled runner apparatus of the character set forth in the preceding object, wherein the bottom longitudinal portion of each sled runner has a smooth sliding surface providing a minimum of longitudinal friction.

It is a further object of the present invention to provide improved sled runner apparatus of the character set forth in the preceding object, wherein each of the bottom junction means may be provided with shield means carried by the most forwardly positioned one of the junction ends and extending rearwardly under and beyond the most rearwardly positioned one of said junction ends.

It is a further object of the present invention to provide improved sled runner apparatus wherein the junction means does not comprise hinge means, as set forth hereinabove, but merely comprises a conveniently separable junction removably fastened together by splice plate means and controllably removable fastening means fastening the splice plate means in connecting relationship with each pair of adjacent U-shaped junction ends comprising each junction means.

It is a further object of the present invention to provide the combination of a wagon including front and rear wheels with sled runner apparatus of the character set forth in any of the preceding objects.

Other and allied objects will be apparent to those skilled in the art after a careful study of the accompanying illustrations, the present specification, and the appended claims.

To facilitate understanding, reference will be made to the hereinbelow-described drawings, in which:

Fig. 1 is a perspective view of one embodiment of sled runner apparatus of the present invention in mounted relationship with respect to the wheels of a wagon (shown in fragmentary form) whereby to effectively immobilize said wheels and isolate them from an underlying supporting surface (not shown);

Fig. 2 is a fragmentary perspective view similar to the right portion of Fig. 1 and illustrates a slight modification in the immobilizing and isolating engagement of the curved rear portion of the near sled runner with respect to the wagon wheel;

Fig. 3 is a larger scale vertical sectional view taken in the direction of the arrows 3—3 in Fig. 2;

Fig. 4 is an enlarged fragmentary perspective view of the lower junction means in the near sled runner seen in Fig. 1;

Fig. 5 is a vertical sectional view taken in the direction of the arrows 5—5 in Fig. 4;

Fig. 6 is a bottom view of the junction means shown in Figs. 4 and 5, with certain portions broken away for clarity;

Fig. 7 is an enlarged fragmentary perspective view of the upper junction means in the near sled runner seen in Fig. 1;

Fig. 8 is a perspective view, of aspect similar to Fig. 7, but illustrating a slightly modified form of junction means;

Fig. 9 is a vertical sectional view taken in the direction of the arrows 9—9 in Fig. 8; and Fig. 10 is a perspective view, of aspect similar to Fig. 4, but illustrates the slightly modified form of junction means shown in Figs. 8 and 9.

The sled runner apparatus of the present invention includes a left sled runner and a right sled runner which, in the specific example illustrated in Fig. 1, are indicated generally by the reference numeral 20. Each sled runner includes a longitudinal bottom portion provided with a front end and a rear end, a vertically spaced longitudinal top portion provided with a front end and a rear end, a forwardly convexly curved front portion interconnecting the front ends of said bottom and top portions, and a rearwardly convexly curved rear portion interconnecting the rear ends of said bottom and top portions.

Since Fig. 1 is the only figure showing both of the sled runners 20, the description to follow will describe only the left sled runner 20; it being understood that the right sled runner 20 is identical in structure. The longitudinal bottom portion of the sled runner 20 referred to above is indicated at 21. The vertically spaced longitudinal top portion is indicated by the reference numeral 22, the forwardly convexly curved front portion is indicated by the reference numeral 23, and the rearwardly convexly curved rear portion is indicated by the reference numeral 24.

In the specific example illustrated, the curved front and rear portions 23 and 24 are of substantially U-shaped concavely inwardly directed cross-sectional configuration of a size and shaped adapted to receive therein corresponding circumferential portions of corresponding front and rear wheels of a wagon whereby to effectively immobilize said wheels and isolate them from an underlying supporting surface. In the specific example illustrated, the left front wheel is indicated by the reference numeral 25 and the left rear wheel is indicated by the reference numeral 26, while said circumferential portions of said front and rear wheels 25 and 26 take the form of tires 27 and 28 which are received within the corresponding curved front and rear portions 23 and 24, as is clearly shown in Fig. 3, thus immobilizing each of the wheels 25 and 26 and completely isolating them from any underlying surface (not shown) such as snow, ice, or the like. Incidentally, it will be noted that the curved rear portion 24 may extend somewhat behind the rear wheel 26 as is shown in Fig. 1, or may closely engage the rear of said wheel as is shown in Fig. 2. The first arrangement shown in Fig. 1 allows the entire sled runner 20 to be engaged on the wheels of wagons of slightly different wheelbase length without interfering with the efficiency of the wheel immobilizing and isolating operation of the sled runners 20, while Fig. 2 shows an arrangement wherein the wheelbase length of the wagon is exactly right to cause the rear wheel 26 to snugly fit into the entire inner periphery of the curved rear portion 24.

Each sled runner is provided with junction means effectively interconnected between the front curved portion of said sled runner and front ends of said top and bottom portions thereof, or elsewhere. In the specific example illustrated in Figs. 1–7, said junction means comprise hinge means, and are indicated at 29 and 30, with each of said hinge means providing for transverse pivotal movement of the curved front portion 23 with respect to front ends of said longitudinal top and bottom portions 22 and 21 to allow turning movement of the wagon front wheel 25 received in the front curved portion 23 of the sled runner 20. In the specific example illustrated in Figs. 1–7, each of the hinge means includes cross-sectionally U-shaped adjacent junction ends, such as are shown at 31 and 32 in the case of the lower hinge means 29, and such as are shown at 33 and 34 in the case of the upper hinge means 30. Furthermore, each of the hinge means includes longitudinal tongue means of lesser transverse dimension than the transverse spacing within each of the U-shaped junction ends and extending across the adjacent pairs of said U-shaped junction ends, which comprise each of the hinge means. In the specific example illustrated, in Figs. 1–7, the tongue means of the lower hinge means 29 is indicated at 35 and is carried by an inverted U-shaped cover member 36 positioned within the U-shaped junction end 31; said tongue 35 extending across the junction of the two U-shaped junction ends 31 and 32 and into a position under a similar inverted U-shaped member 37 positioned within the other U-shaped junction end 32. Spring means indicated at 38 is effectively connected to retaining cotter pin means 39 in a manner extending across the pair of U-shaped junction ends 31 and 32 and underneath the tongue 35 and the inverted U-shaped member 37, whereby to effectively form the hinge means 29, which is capable of a limited degree of lateral pivotal movement whereby to allow the front wheel 25 to turn so as to allow the entire wagon W to be controllably steered when it is operating as a sled in the manner shown in Fig. 1. It should be noted that the upper hinge means 30 also has a longitudinal tongue means 40 which comprises an extension of the U-shaped junction end 33 and which extends under and inside the other U-shaped junction end 34. This hinge means 30 also includes spring means (not shown but identical to the spring means 38 shown in Figs. 5 and 6) connected to the retaining cotter pins 41 in a manner similar to the connection of the spring means 38 in Figs. 6 and 6 to the cotter pins 39, thus making the hinge means 30 capable of a limited degree of lateral pivotal movement in a manner similar to the lower hinge means 29 described above.

It will be noted that the bottom longitudinal portion 21 has a smooth sliding surface, such as is indicated at 42, providing a minimum of longitudinal friction and facilitating the operation of the device as a sled. Furthermore, in order to further minimize friction and facilitate the operation of the device as a sled, one preferred form of the invention may include shield means, such as is indicated at 43, carried by the most forwardly positioned one of said junction ends of each bottom junction means, such as the bottom forward junction end 31; said shield 43 extending rearwardly under and beyond the most rearwardly positioned one of said junction ends, such as the junction end 32. It will be understood that the shield 43 will act to prevent underlying ice or snow from being engaged by either of the closely adjacent surfaces of the junction ends 31 and 32, thus minimizing any possible braking effect which might occur as a result thereof. It should be noted that either of the hinge means 29 or 30 may be disengaged and separated by removal of the cotter pins 39, 41, and 44, thus facilitating the initial engagement of the entire sled runner 20 on the wheels 25 and 26, and also the disengagement therefrom, when desired. Furthermore, it should be noted that both of the hinge means 29 and 30 may be of the same type, which may be either the type shown at the top of Fig. 1 or at the bottom of Fig. 1. Furthermore, it should be noted that each of the sled runner 20 may be reversible with respect to the wheels 25 or 26, when desired, in order to equalize wear on both the bottom and the top of the sled runner. It should also be noted that, in the claims, the front curved portion 23 and the rear curved portion 24 are referred to as being connected to the longitudinal bottom portion 21 and the longitudinal top portion 22 at front and rear ends thereof. This is an entirely arbitrary statement, and for the purposes of the claims, said front end of the top longitudinal portion 22 may be said to be the U-shaped junction end 34, while the front end of the bottom longitudinal portion 21 may be said to be the front end of the U-shaped junction member 32. In each case, the rear end of the top and bottom longitudinal portions 22 and 21 may be said to be that location where they effectively join the rear curved portion 24.

Figs. 8 and 9 illustrate a slight modification of the upper junction means 30 shown in Fig. 1 and are indicated by the reference numeral 30′. In this modification, each of the junction ends 33′ and 34′ are effectively joined together by a substantially U-shaped splice plate 45 of lesser transverse dimension than the interior transverse dimension of each of the junction ends 33′ and 34′, which is maintained in said connecting relationship by controllably removable retaining cotter pin means indicated at 46.

Fig. 10 illustrates a modified lower junction means 29′ which is of the same construction as the junction means 30′ shown in Figs. 8 and 9. In this version, the retaining or fastening pins 47 fasten the U-shaped splice plate 48 within each of the U-shaped junction ends 31 and 32 and effectively join said junction ends together. It will be noted that the junction means 30' shown in Figs. 8 and 9 and the junction means 29' shown in Fig. 10 can be easily separated by removing the cotter pins 46 and 47, thus facilitating the engagement and disengagement of the entire runner with respect to front and rear wagon wheels in the manner described hereinbefore, and also facilitating the vertical transposition or reversal of the entire sled runners to equalize top and bottom wear in the manner referred to hereinbefore.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. Sled runner apparatus adapted to be removably mounted on the wheels of a wagon to controllably convert the wagon into a sled, comprising: a left sled runner and a right sled runner; each sled runner including a longitudinal bottom portion provided with a front end and a rear end, a vertically spaced longitudinal top portion provided with a front end and a rear end, a forwardly convexly curved front portion interconnecting the front ends of said bottom and top portions, and a rearwardly convexly curved rear portion interconnecting the rear ends of said bottom and top portions; said curved front and rear portions of each sled runner being of substantially U-shaped concavely inwardly directed cross-sectional configuration of a size and shape adapted to receive therein corresponding circumferential portions of corresponding front and rear wheels of a wagon whereby to effectively immobilize said wheels and isolate them from an underlying supporting surface; each sled runner being provided with junction means effectively interconnected between said front curved portion of said sled runner and said front ends of said top and bottom portions thereof; said junction means comprising hinge means providing for transverse pivotal movement of said curved front portion with respect to the front end of said longitudinal top and bottom portions to allow turning movement of a wagon front wheel adapted to be received within said front curved portion of said sled runner; said hinge means including cross-sectionally U-shaped junction ends carried at the top rear and at the bottom rear of said curved front portion and corresponding cross-sectionally U-shaped junction ends carried at the forward ends of said top and bottom longitudinal portions, and longitudinal tongue means of lesser transverse dimension than the transverse spacing within each of said U-shaped junction ends extending across adjacent pairs of said U-shaped junction ends, and spring means fastened to and resiliently extending across each pair of said adjacent U-shaped junction ends defining each of said hinge means; cover means effectively covering said longitudinal tongue means; pin means comprising a part of said hinge means and being removably carried by said junction ends and disengageable from said junction ends for disconnecting said hinge means; shield means carried by the most forwardly positioned one of said junction ends of each bottom junction means and extending rearwardly under and beyond the most rearwardly positioned one of said junction ends; said bottom longitudinal portion of each sled runner having a smooth sliding surface providing a minimum of longitudinal friction.

2. Apparatus of the character defined in claim 1 in combination with a wagon including front and rear wheels.

References Cited in the file of this patent

UNITED STATES PATENTS

| | | |
|---|---|---|
| 395,398 | Lewis | Jan. 1, 1889 |
| 1,095,381 | Clark | May 5, 1914 |
| 1,995,681 | Lamoy | Mar. 26, 1935 |
| 2,559,452 | McLellan | July 3, 1951 |